(12) United States Patent
Wang et al.

(10) Patent No.: US 12,260,462 B2
(45) Date of Patent: Mar. 25, 2025

(54) REAL-TIME EXPENSE AUDITING AND MACHINE LEARNING SYSTEM

(71) Applicant: Oracle International Corporation, Redwood Shores, CA (US)

(72) Inventors: Winston Leonard Wang, San Francisco, CA (US); Parker Ralph Kuncl, Seattle, WA (US); Kelly Bailey, San Francisco, CA (US); Matthew Brigante, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/017,380

(22) Filed: Sep. 10, 2020

(65) Prior Publication Data

US 2021/0073920 A1    Mar. 11, 2021

Related U.S. Application Data

(60) Provisional application No. 62/898,699, filed on Sep. 11, 2019.

(51) Int. Cl.
*G06Q 40/12* (2023.01)
*G06F 40/30* (2020.01)
(Continued)

(52) U.S. Cl.
CPC ........... *G06Q 40/12* (2013.12); *G06N 5/04* (2013.01); *G06N 20/00* (2019.01); *G06Q 10/105* (2013.01); *G06F 40/30* (2020.01)

(58) Field of Classification Search
None
See application file for complete search history.

(56) References Cited

U.S. PATENT DOCUMENTS 5,966,126 A    10/1999    Szabo
6,029,144 A *  2/2000    Barrett ............... G06Q 99/00
                                                       235/375

(Continued)

OTHER PUBLICATIONS

Yang, Jie, et al. "Deep learning aided system design method for intelligent reimbursement robot." IEEE Access 7 (2019): 96232-96239 (Year: 2019).

(Continued)

*Primary Examiner* — Florian M Zeender
*Assistant Examiner* — Kimberly S. Bursum
(74) *Attorney, Agent, or Firm* — Invoke

(57) ABSTRACT

Techniques for real-time expense auditing and machine learning are disclosed. An expense auditing system trains a machine learning model to compute audit risk scores as a function of expense descriptions. The auditing system receives an expense description associated with an employee. The expense auditing system computes, using the trained machine learning model, an audit risk score associated with the expense description. The expense auditing system compares the audit risk score with an audit trigger. The audit trigger includes one or more conditions that, when satisfied, identifies expense descriptions that are at risk of being audited. The expense auditing system determines that the audit risk score satisfies the audit trigger. Responsive to determining that the audit risk score satisfies the audit trigger, the expense auditing system alerts the employee that the expense description is at risk of being audited.

23 Claims, 9 Drawing Sheets

(51) Int. Cl.
*G06N 5/04* (2023.01)
*G06N 20/00* (2019.01)
*G06Q 10/105* (2023.01)

(56) References Cited

U.S. PATENT DOCUMENTS

| | | |
|---|---|---|
| 9,892,106 B1 | 2/2018 | Lesner et al. |
| 10,235,720 B2 | 3/2019 | Abraham et al. |
| 10,325,223 B1* | 6/2019 | Arel .................... G06N 3/044 |
| 10,592,544 B1* | 3/2020 | Dasgupta ............. G06F 16/353 |
| 10,748,157 B1 | 8/2020 | Indyk et al. |
| 10,810,574 B1 | 10/2020 | Wilson et al. |
| 10,878,514 B2 | 12/2020 | Bender et al. |
| 11,068,477 B1 | 7/2021 | Tuckfield et al. |
| 11,321,784 B2 | 5/2022 | Verma et al. |
| 11,423,451 B1 | 8/2022 | Chaudhari et al. |
| 2006/0085408 A1 | 4/2006 | Morsa |
| 2006/0206506 A1* | 9/2006 | Fitzpatrick ............ G06Q 20/20 |
| 2008/0104001 A1 | 5/2008 | Kipp |
| 2009/0055270 A1 | 2/2009 | Magdon-Ismail et al. |
| 2009/0265232 A1 | 10/2009 | Gopalakrishnan et al. |
| 2010/0017316 A1* | 1/2010 | Joseph .................. G06Q 10/10 705/30 |
| 2012/0185368 A1 | 7/2012 | Schloter et al. |
| 2012/0317003 A1 | 12/2012 | McGrane |
| 2013/0041792 A1 | 2/2013 | King et al. |
| 2013/0226751 A1 | 8/2013 | Friedholm et al. |
| 2014/0046812 A1 | 2/2014 | Fan et al. |
| 2014/0122146 A1* | 5/2014 | Deist ..................... G06Q 10/06 705/7.15 |
| 2015/0235143 A1 | 8/2015 | Eder |
| 2016/0042424 A1 | 2/2016 | Macnair et al. |
| 2016/0078566 A1 | 3/2016 | Farrell et al. |
| 2016/0171557 A1 | 6/2016 | Fanous et al. |
| 2016/0350867 A1 | 12/2016 | Votaw et al. |
| 2016/0358268 A1* | 12/2016 | Verma ................... G06Q 40/12 |
| 2017/0004448 A1 | 1/2017 | Randles et al. |
| 2017/0083920 A1 | 3/2017 | Zoldi et al. |
| 2017/0116679 A1 | 4/2017 | Abraham et al. |
| 2018/0012268 A1 | 1/2018 | Simantov et al. |
| 2018/0075391 A1 | 3/2018 | Chung et al. |
| 2018/0137576 A1 | 5/2018 | Chu et al. |
| 2018/0322287 A1 | 11/2018 | Zhao et al. |
| 2018/0350006 A1* | 12/2018 | Agrawal ................ G06F 7/08 |
| 2019/0014488 A1 | 1/2019 | Tan et al. |
| 2019/0065564 A1 | 2/2019 | Twig et al. |
| 2019/0102392 A1 | 4/2019 | Tseretopoulos et al. |
| 2019/0116187 A1 | 4/2019 | Gahnoog et al. |
| 2019/0156198 A1 | 5/2019 | Mars et al. |
| 2019/0236095 A1 | 8/2019 | Achan et al. |
| 2019/0236552 A1 | 8/2019 | Rouseau et al. |
| 2019/0303781 A1 | 10/2019 | Clark et al. |
| 2019/0378050 A1 | 12/2019 | Edkin et al. |
| 2019/0378136 A1 | 12/2019 | Efraim et al. |
| 2019/0385080 A1 | 12/2019 | Wu et al. |
| 2020/0020015 A1 | 1/2020 | Anders et al. |
| 2020/0058078 A1 | 2/2020 | Li et al. |
| 2020/0065912 A1* | 2/2020 | Bender ................... G10L 17/00 |
| 2020/0074359 A1 | 3/2020 | Subramanian et al. |
| 2020/0118137 A1 | 4/2020 | Sood et al. |
| 2020/0234297 A1 | 7/2020 | Murray et al. |
| 2020/0258060 A1 | 8/2020 | Le et al. |
| 2020/0272309 A1 | 8/2020 | Xiao et al. |
| 2020/0279219 A1 | 9/2020 | Desai et al. |
| 2020/0293564 A1* | 9/2020 | Reh ........................ G06N 3/08 |
| 2020/0293653 A1 | 9/2020 | Huang et al. |
| 2020/0311729 A1 | 10/2020 | Matthews et al. |
| 2021/0004370 A1 | 1/2021 | Sekharan et al. |
| 2021/0004810 A1 | 1/2021 | Lind et al. |
| 2021/0004949 A1 | 1/2021 | Broyda et al. |
| 2021/0073735 A1 | 3/2021 | Wang et al. |
| 2021/0073921 A1 | 3/2021 | Wang et al. |
| 2021/0073922 A1 | 3/2021 | Wang et al. |
| 2021/0398118 A1* | 12/2021 | Stark .................... G06Q 20/047 |
| 2022/0261759 A1 | 8/2022 | Fredericks et al. |

OTHER PUBLICATIONS

Artjoms Suponenkovs, et al., "Application of image recognition and machine learning technologies for payment data processing review and challenges", 5th IEEE Workshop on Advances in Information, Electronic and Electrical Engineering (AIEEE), IEEE, 2017, pp. 1-6.

Iyengar, VijayS., et al. "Analytics for Audit and Business Controls in Corporate Travel and Entertainment." AusDM 7 (2007): 3-12 (Year: 2007).

Zeki Bozkus, et al., "Analytical expense management system." 2009 First International Conference on Networked Digital Technologies. IEEE, 2009, pp. 527-532.

Zhu et al., "Extracting relevant named entities for automated expense reimbursement", Proceedings of the 13th ACM SIGKDD international conference on Knowledge discovery and data mining, 2007, pp. 1004-1012.

* cited by examiner

REAL-TIME EXPENSE AUDITING AND MACHINE LEARNING SYSTEM

RELATED APPLICATIONS; INCORPORATION BY REFERENCE

This application claims the benefit of U.S. Provisional Patent Application 62/898,699, filed Sep. 11, 2019, which is hereby incorporated by reference.

This application is related to: U.S. Provisional Patent Application 62/898,695, titled "Expense Report Generation System"; U.S. Provisional Patent Application 62/898,712, titled "Expense Report Reviewing Interface"; U.S. Provisional Patent Application 62/898,705, titled "Expense Receipt Processing System"; U.S. Provisional Patent Application 62/898,718, titled "Expense Report Submission Interface"; and U.S. Provisional Patent Application 62/898,724, titled "Reimbursable Expense Recommendation System". All of the aforementioned patent applications are hereby incorporated by reference.

TECHNICAL FIELD

The present disclosure relates to business expenses. In particular, the present disclosure relates to expense reporting.

BACKGROUND

During the course of business-related activity (e.g., domestic or international travel, site visits and/or other kinds of business meetings, meals with customers and/or prospective customers, routine business operations, promotional events, and/or any other kind of business-related activity or combination thereof), employees sometimes incur expenses that are reimbursable by their employer as business expenses. To obtain reimbursement for such expenses, an employee typically submits an expense report. An expense report is a report that includes one or more expense descriptions. Each expense description includes expense data that describes one or more business expenses incurred by the employee. Expense data may include but is not limited to: a name of the employee that incurred the expense, a date the expense was incurred, a type of expense, a reason for the expense, an amount of the expense, a venue corresponding to the expense, a business project associated with the expense, a number of employees that benefited from the expense. An expense description template or expense report template may define a set of mandatory and/or non-mandatory fields to be filled out when preparing an expense description or expense report.

Businesses typically impose limits on reimbursable business expenses. Each expense limit may apply to an entire organization, a particular business unit, and/or one or more particular employees. Expense auditing is the process of determining, for each expense described in an expense report, whether the expense is approved for reimbursement.

Generating and/or auditing expense reports may be subject to various kinds of errors and inefficiencies. If an employee neglects to include an incurred expense in an expense report, the employee may end up paying for that expense out-of-pocket. If an employee is not aware of an opportunity for reimbursement, the employee may fail to take advantage of that expense opportunity. If an employee fails to properly manage spending, the employee may incur expenses that are partially or wholly non-reimbursable. Because preparing expense reports manually is time-consuming, an employee may delay preparing an expense report and subsequently forget to include reimbursable expenses in the expense report. Some employees may habitually overspend relative to an expense limit, while other employees may habitually underspend relative to the same expense limit. Some employees may include non-reimbursable expenses in expense reports. Habitual overspending, underspending, and/or non-reimbursable expense reporting may adversely affect organizational and/or individual expense budgets. In addition, depending on the number of employees submitting expense reports and/or the complexity of the organization's expense reimbursement rules, auditing expense reports may be time-consuming and error-prone. Generating and/or auditing expense reports may be subject to many other kinds of errors and inefficiencies.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
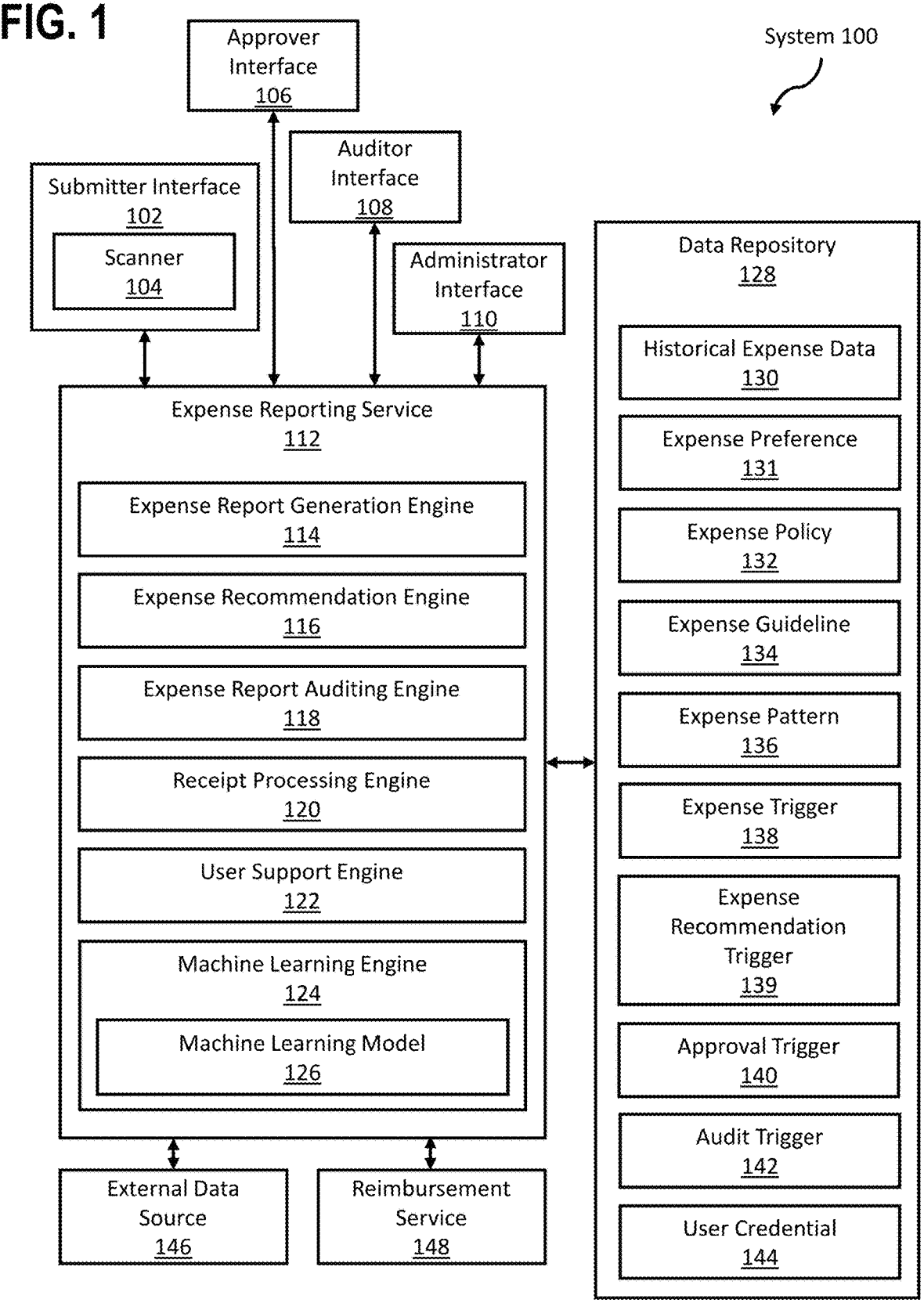
FIG. 1 illustrates a system in accordance with one or more embodiments.
Figure 2A:
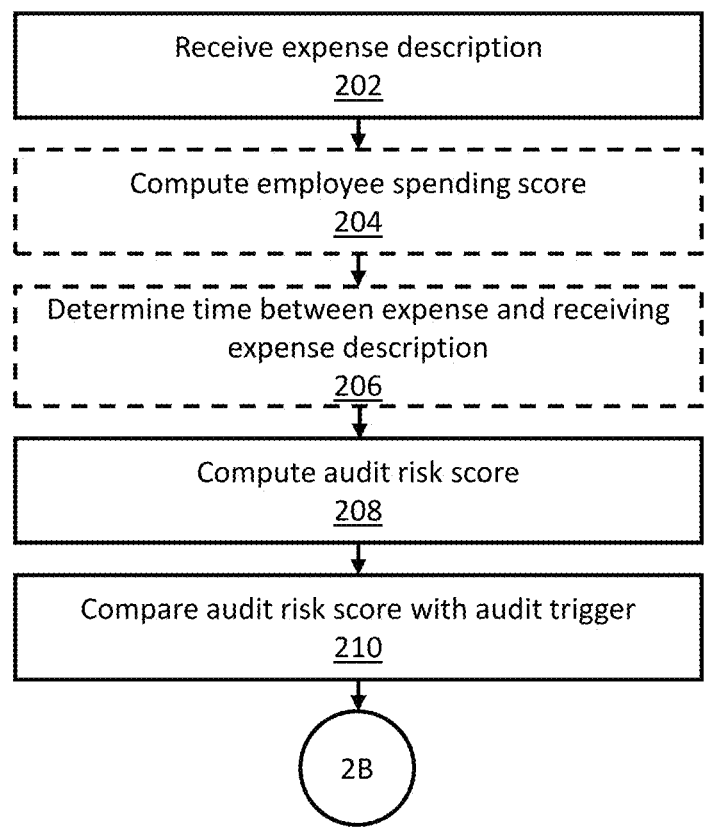
FIGS. 2A-2B illustrate a set of operations for real-time expense auditing in accordance with one or more embodiments.
Figure 2B:
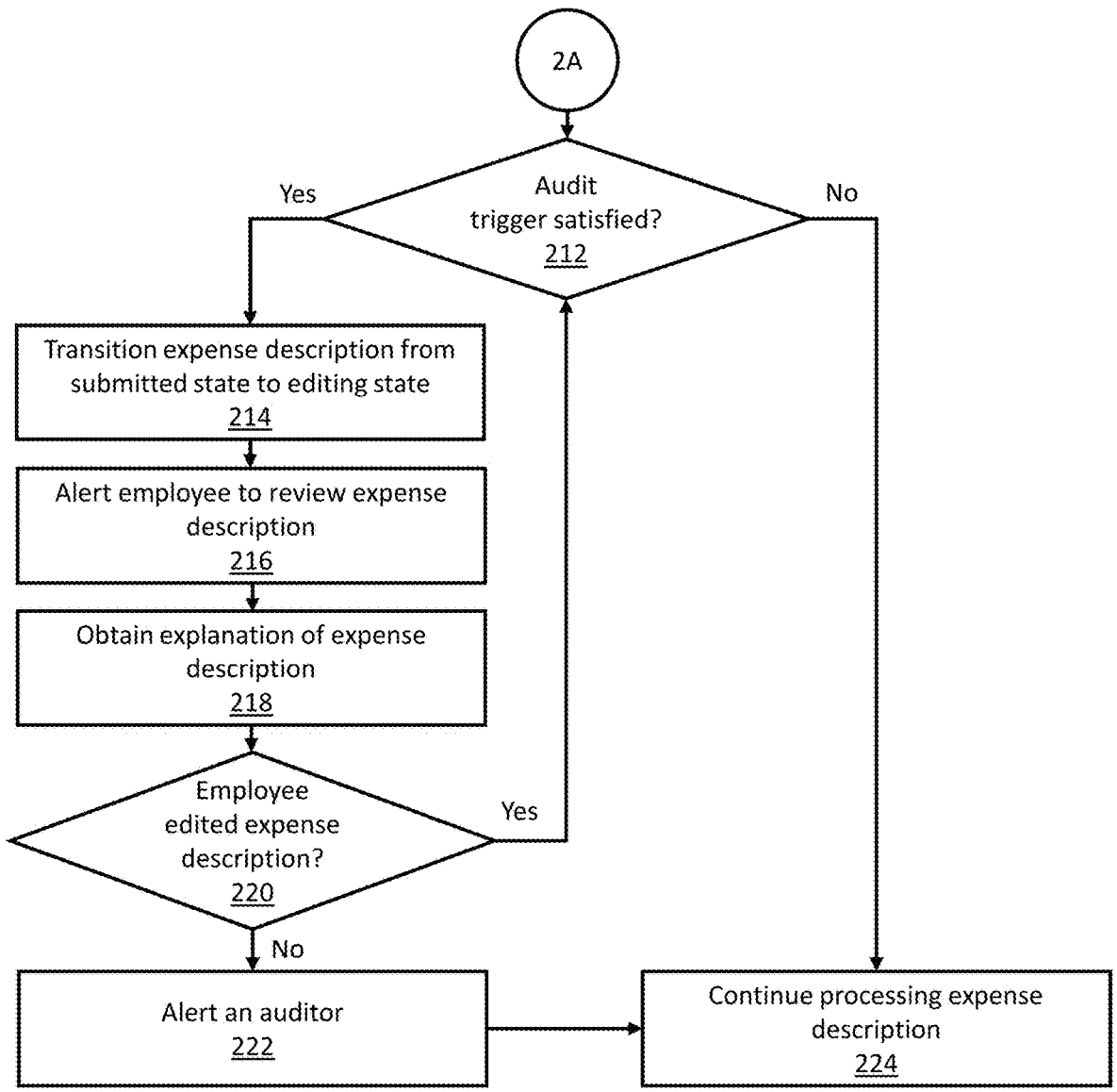

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. REAL-TIME EXPENSE AUDITING
4. MACHINE LEARNING BASED SCORING AND AUDIT TRIGGERS
5. ILLUSTRATIVE EXAMPLES
6. HARDWARE OVERVIEW
7. COMPUTER NETWORKS AND CLOUD NETWORKS

8. MICROSERVICE APPLICATIONS
9. MISCELLANEOUS; EXTENSIONS

1. GENERAL OVERVIEW

One or more embodiments reduce the incidence of rejected expense descriptions by proactively warning employees that an expense description is at risk of being audited. An expense auditing system may identify expense descriptions that are at risk of being audited in real-time, i.e., as the expense descriptions are received and optionally before the expense descriptions are submitted for approval. By warning employees that an expense description is at risk of being audited, the expense auditing system provides an employee with an opportunity to edit and/or explain the expense description before review by an auditor. The edit and/or explanation may provide the auditor with sufficient information to identify the expense as reimbursable, in situations where the expense might otherwise have been rejected in the absence of the edit and/or explanation.

The expense auditing system may further leverage machine learning to facilitate and automate various aspects of the auditing process. In some embodiments, the expense auditing system learns how to assess and predict audit risks based on a set of training examples. For example, the expense auditing system may automatically learn what patterns are predictive of the likelihood that a pattern of activities will trigger an audit and/or contravene expense policies. When the expense auditing system identifies a new expense, the trained model may generate an audit score representing a risk that the new expense will be audited. The expense auditing system may alert a user if the audit risk exceeds a threshold.

In some embodiments, the techniques described herein are implemented by or interface with an intelligent agent, such as a virtual assistant persona. Users may submit natural language queries to the intelligent agent about whether expenses are likely to be audited. The intelligent agent may leverage natural language processing to map the query to intents and determine how to respond. The intelligent agent may further leverage the machine learning techniques described herein to predict whether an expense is an audit risk and formulate the natural language response. Additionally or alternatively, the intelligent agent may proactively provide suggestions to a user on expenses that are less likely to be audited.

One or more embodiments described in this Specification and/or recited in the claims may not be included in this General Overview section.

2. ARCHITECTURAL OVERVIEW

FIG. 1 illustrates a system 100 in accordance with some embodiments. As illustrated in FIG. 1, system 100 includes a submitter interface 102, an approver interface 106, an auditor interface 108, an administrator interface 110, an expense reporting service 112, a data repository 128, an external data source 146, a reimbursement service 148, and various components thereof. In some embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In some embodiments, each of submitter interface 102, approver interface 106, auditor interface 108, and administrator interface 110 refers to hardware and/or software configured to facilitate communications between a user and an expense reporting service 112. A submitter interface 102 may be used by a user, such as an employee, who is responsible for preparing and submitting expense descriptions and/or expense reports. The submitter interface 102 may be associated with one or more devices for obtaining visual media that represents a receipt for an expense, such as a scanner 104, a camera, a video device, or any other kind of device configured to capture visual media. An approver interface 106 may be used by a user, such as an employee in a managerial role, who is responsible for approving expense reports prior to submission for reimbursement. In some embodiments, expense reports are not subject to managerial approval prior to submission for reimbursement. An auditor interface 108 may be used by a user, such as an employee in an auditor role, who is responsible for auditing expense reports. An administrator interface 110 may be used by a user, such as an employee in an administrative role, who is responsible for determining and/or configuring parameters, rules, etc., that are used by an expense reporting service 112. One or more of a submitter interface 102, approver interface 106, auditor interface 108, and administrator interface 110 may be the same interface. A user may have multiple roles corresponding to submitter, approver, auditor, and/or administrator. For example, an employee who audits expense reports may also submit their own expense reports.

In some embodiments, a user interface (e.g., submitter interface 102, approver interface 106, auditor interface 108, and/or administrator interface 110) renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In some embodiments, different components of a user interface (e.g., submitter interface 102, approver interface 106, auditor interface 108, and/or administrator interface 110) are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, a user interface may be specified in one or more other languages, such as Java, C, or C++.

In some embodiments, an expense reporting service 112 includes an expense report generation engine 114. An expense report generation engine 114 refers to hardware and/or software configured to perform operations described herein (including such operations as may be incorporated by reference) for generating expense reports.

In some embodiments, an expense reporting service 112 includes an expense recommendation engine 116. An expense recommendation engine 116 refers to hardware and/or software configured to perform operations described herein (including such operations as may be incorporated by reference) for recommending expenses.

In some embodiments, an expense reporting service 112 includes an expense report auditing engine 118. An expense report auditing engine 118 refers to hardware and/or software configured to perform operations described herein (including such operations as may be incorporated by reference) for auditing expense descriptions and/or expense reports.

In some embodiments, an expense reporting service 112 includes a receipt processing engine 120. A receipt processing engine 120 refers to hardware and/or software configured to perform operations described herein (including such operations as may be incorporated by reference) for processing expense receipts.

In some embodiments, an expense reporting service 112 includes a user support engine 122. A user support engine 122 refers to hardware and/or software configured to perform operations described herein (including such operations as may be incorporated by reference) for processing and responding to user queries submitted to the expense reporting service 112.

In some embodiments, one or more components of the expense reporting service use a machine learning engine 124. Machine learning includes various techniques in the field of artificial intelligence that deal with computer-implemented, user-independent processes for solving problems that have variable inputs.

In embodiment, the machine learning engine 124 trains a machine learning model 126 to perform one or more operations. Training a machine learning model 126 uses training data to generate a function that, given one or more inputs to the machine learning model 126, computes a corresponding output. The output may correspond to a prediction based on prior machine learning. In some embodiments, the output includes a label, classification, and/or categorization assigned to the provided input(s). The machine learning model 126 corresponds to a learned model for performing the desired operation(s) (e.g., labeling, classifying, and/or categorizing inputs). An expense reporting service 112 may use multiple machine learning engines 124 and/or multiple machine learning models 126 for different purposes.

In some embodiments, the machine learning engine 124 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 124 receives positive and/or negative reinforcement in the process of attempting to solve a particular problem (e.g., to optimize performance in a particular scenario, according to one or more predefined performance criteria). In some embodiments, the machine learning engine 124 initially uses supervised learning to train the machine learning model 126 and then uses unsupervised learning to update the machine learning model 126 on an ongoing basis.

In some embodiments, a machine learning engine 124 may use many different techniques to label, classify, and/or categorize inputs. A machine learning engine 124 may transform inputs into feature vectors that describe one or more properties ("features") of the inputs. The machine learning engine 124 may label, classify, and/or categorize the inputs based on the feature vectors. Alternatively or additionally, a machine learning engine 124 may use clustering (also referred to as cluster analysis) to identify commonalities in the inputs. The machine learning engine 124 may group (i.e., cluster) the inputs based on those commonalities. The machine learning engine 124 may use hierarchical clustering, k-means clustering, and/or another clustering method or combination thereof. In some embodiments, a machine learning engine 124 includes an artificial neural network. An artificial neural network includes multiple nodes (also referred to as artificial neurons) and edges between nodes. Edges may be associated with corresponding weights that represent the strengths of connections between nodes, which the machine learning engine 124 adjusts as machine learning proceeds. Alternatively or additionally, a machine learning engine 124 may include a support vector machine. A support vector machine represents inputs as vectors. The machine learning engine 124 may label, classify, and/or categorizes inputs based on the vectors. Alternatively or additionally, the machine learning engine 124 may use a naïve Bayes classifier to label, classify, and/or categorize inputs. Alternatively or additionally, given a particular input, a machine learning model may apply a decision tree to predict an output for the given input. Alternatively or additionally, a machine learning engine 124 may apply fuzzy logic in situations where labeling, classifying, and/or categorizing an input among a fixed set of mutually exclusive options is impossible or impractical. The aforementioned machine learning model 126 and techniques are discussed for exemplary purposes only and should not be construed as limiting some embodiments.

In some embodiments, as a machine learning engine 124 applies different inputs to a machine learning model 126, the corresponding outputs are not always accurate. As an example, the machine learning engine 124 may use supervised learning to train a machine learning model 126. After training the machine learning model 126, if a subsequent input is identical to an input that was included in labeled training data and the output is identical to the supervisory signal in the training data, then output is certain to be accurate. If an input is different from inputs that were included in labeled training data, then the machine learning engine 124 may generate a corresponding output that is inaccurate or of uncertain accuracy. In addition to producing a particular output for a given input, the machine learning engine 124 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In some embodiments, a data repository 128 is any type of storage unit and/or device (e.g., a file system, database, collection of tables, or any other storage mechanism) for storing data. Further, a data repository 128 may include multiple different storage units and/or devices. The multiple different storage units and/or devices may or may not be of the same type or located at the same physical site. Further, a data repository 128 may be implemented or may execute on the same computing system as one or more other components of the system 100. Alternatively or additionally, a data repository 128 may be implemented or executed on a computing system separate from one or more other components of the system 100. A data repository 128 may be communicatively coupled to one or more other components of the system 100 via a direct connection or via a network.

In some embodiments, a data repository 128 is configured to store historical expense data 130. Historical expense data 130 may include any kind of data that the expense reporting service 112 has previously received and/or generated in association with expenses. Specifically, the historical expense data 130 may include expense reports, expense descriptions, metadata associated with expenses (e.g., geotags, dates and times, explanatory notes, and/or another kind of metadata or combination thereof), and/or any other kind of data or combination thereof associated with expenses. Historical expense data 130 may include data that is associated with one or more employees' target activity, which may also be associated (directly or indirectly) with one or more expenses. For example, historical expense data 130 may include one or more itineraries, location check-ins, phone records, emails, social media messages, calendar appointments, and/or any other kind of data or combination thereof associated with business-related activity.

In some embodiments, a data repository 128 is configured to store one or more expense preferences 131. An expense preference 131 includes one or move values that indicates one or more employees' preferences related to expenses that the employee(s) may incur during target activity. For example, an expense preference 131 may indicate that an employee prefers ride sharing over public transportation. As another example, an expense preference 131 may indicate that an employee has a dietary restriction (e.g., vegetarian, vegan, kosher, etc.). As another example, an expense preference 131 may indicate that an employee likes or dislikes a particular restaurant, hotel, or other establishment. An embodiment, an expense reporting service 112 uses a machine learning engine 124 to infer one or more employee preferences 131 from historical expense data 130. One or more triggers described herein may be based, at least in part, on one or more expense preferences 131.

In some embodiments, a data repository 128 is configured to store one or more expense policies 132. An expense policy 132 may be a set of one or more codified rules corresponding to criteria for reimbursable expenses. For example, example, an expense policy 132 may define one or more expense categories that are used to categorize reimbursable expenses (e.g., meals, transportation, incidentals, equipment, etc.). As another example, an expense policy 132 may define an expense limit that is applicable to one or more employees and/or one or more expense categories for a particular unit of time (e.g., day, week, month, year, etc.). As another example, an expense policy 132 may identify one or more kinds of expenses and/or establishments (e.g., particular stores or restaurants) for which expenses are not reimbursable. Many different kinds of expense policy 132 may be defined. An expense policy 132 may apply the level of an entire organization, a business unit, a team, an individual, or any other set of one or more employees or combination thereof.

In some embodiments, a data repository 128 is configured to store one or more expense guidelines 134. An expense guideline 134 may be a set of one or more codified rules corresponding to best practices for expenses and/or responsible spending guidelines. An expense guideline 134 may be more restrictive than an expense policy 132. For example, a particular expense that satisfies an expense policy 132 may fail to satisfy an expense guideline 134 because, even though the expense is within an allowable limit under the expense policy 132, the expense is inconsistent with responsible spending guidelines. An expense guideline 134 may apply the level of an entire organization, a business unit, a team, an individual, or any other set of one or more employees or combination thereof.

In some embodiments, a data repository 128 is configured to store one or more expense patterns 136. An expense pattern 136 identifies a typical and/or expected arrangement of expenses associated with target activity. An expense pattern 136 may be associated with target activity having one or more shared characteristics (e.g., a certain kind of business trip, business-related activity for a particular category of employees, or any other kind of shared characteristic or combination thereof). An expense pattern 136 may identify expenses that are typical for target activity having the shared characteristic(s). In one example, an expense pattern 136 identifies that international business travel typically includes: (1) airfare to and from the destination; (2) a rental car, public transportation, and/or ride sharing at the destination; (3) a hotel for the duration of the trip; (4) an international data roaming plan; and (5) three meals per day at the destination. An expense reporting system 112 may use an expense pattern 136 to identify reimbursable expenses for which an employee may have neglected to submit an expense report (e.g., based on a gap or difference between reported expenses and the expense pattern 136), and/or recommended reimbursable expenses that an employee might otherwise overlook. In some embodiments, an expense reporting service 112 uses a machine learning engine 124 to infer one or more expense patterns 136, based at least in part on historical expense data 130.

In some embodiments, a data repository 128 is configured to store one or more expense triggers 138. An expense trigger 138 is a codified set of rules and/or a set of automatically learned patterns that capture one or more conditions for identifying expenses associated with one or more employees' business-related activity. An expense identified by an expense trigger may be an expense for which an employee has not yet prepared and/or submitted an expense report.

In some embodiments, an expense trigger 138 is based, at least in part, on data corresponding to business-related activity of an employee and/or historical expense data 130. As one example, an expense trigger 138 identifies that a transportation expense may be available when an employee travels from one location to another (e.g., from the employee's home or office to the airport). As another example, an expense trigger 138 identifies that a hotel expense may be available when geolocation data (e.g., from a global positioning system (GPS), a social media check-in, and/or any other kind of data source that supplies geolocation data) indicates that the user has arrived at a hotel or is leaving a hotel. As another example, an expense trigger 138 identifies that a meal expense may be available when geolocation data (e.g., from a global positioning system (GPS), a social media check-in, and/or any other kind of data source that supplies geolocation data) indicates that the user has visited a restaurant.

In some embodiments, when an expense trigger 138 identifies an expense for travel to a location, where return travel is also expected, the expense trigger 138 identifies an expense for the return travel. For example, if an employee prepares an expense description for a taxi to an airport, an expense trigger 138 may identify (e.g., based on an expense pattern 136 for international business travel), a corresponding expense for return travel from the airport.

In some embodiments, an expense trigger 138 is based, at least in part, on one or more expense descriptions prepared by one or more other employees who are traveling with the employee in question. In one example, three employees are participating in the same business trip and two of the employees prepare expense descriptions for a business meal at a particular restaurant. In this example, an expense trigger 138 identify that a corresponding expense at the same restaurant may also apply to the third employee.

In some embodiments, an expense trigger 138 is based, at least in part, on one or more credit card statements for one or more employees. The expense trigger 138 may determine that a particular credit card charge is associated (e.g., corresponds in time and/or geographic location) with an employee's business-related activity. Based on the association between the credit card charge and the employee's business-related activity, the expense trigger 138 may identify the credit card charge as a potentially reimbursable expense.

In some embodiments, an expense trigger 138 is based, at least in part, on a typical and/or expected pairing between two or more different kinds of expenses. In one example, an employee purchases gas at a gas station. However, the employee has not entered an expense description corresponding to a car rental. Based on a typical and expected pairing between gasoline and car rental, an expense trigger 138 may identify a car rental as an available expense for the employee.

In some embodiments, an expense trigger 138 identifies similar expenses over time and identifies an opportunity to enter a recurring expense. As one example, an employee who travels frequently for business submits expense reports each month that include expense descriptions corresponding to an international data roaming plan. An expense trigger 138 may identify the international data roaming plan as a recurring expense. Based on identifying the international data roaming plan as a recurring expense, the expense reporting service 112 may present a message to the employee offering to make the charge a recurring expense, so that the employee does not need to enter the expense description each month.

Many different kinds of expense triggers 138 may be defined. In some embodiments, an expense reporting service 112 uses a machine learning engine 124 to determine an expense trigger 138 as part of a machine learning model 126. Machine learning engine 124 may automatically infer expense triggers even though the exact pattern may not have been seen before. Further, machine learning engine 124 may learn different patterns of behavior that qualify as an expense trigger 138 depending on context. For example, expense triggers may differ depending on employee attributes, such as employee title, clearance level, job responsibilities. Additionally or alternatively, expense triggers may vary between different groups of employees, such as between different companies or organizational departments within the same company. Additionally or alternatively, expense triggers may vary for different temporal patterns, and/or geographic patterns of incurred expenses.

In some embodiments, a data repository 128 is configured to store one or more expense recommendation triggers 139. An expense recommendation trigger 139 is a codified set of rules and/or a set of automatically learned patterns that capture one or more conditions for identifying recommended expenses that are known or expected to be reimbursable. A recommended expense may be an expense that the employee has not yet incurred. In some embodiments, an expense reporting service 112 uses a machine learning engine 124 to determine an expense recommendation trigger 139 as part of a machine learning model 126.

In some embodiments, an expense recommendation trigger 139 is based, at least in part, on data corresponding to business-related activity of an employee and/or historical expense data 130. For example, an expense recommendation trigger 139 may recommend less expensive spending options to an employee who has a tendency to spend above expense limits and/or above expense guidelines. As another example, an expense recommendation trigger 139 may recommend expenses that are popular among similarly situated employees, such as a particular restaurant that other employees have frequented and for which expenses tended to be reimbursed. As another example, an expense recommendation trigger 139 may recommend against frequenting a particular establishment for which expenses tended to be declined.

In some embodiments, an expense recommendation trigger 139 is based, at least in part, on one or more expense preferences 131. For example, an expense recommendation trigger 139 may identify a recommended restaurant for an employee who is vegan or who is meeting with a client who is vegan. As another example, an expense recommendation trigger 139 may identify a recommended restaurant or mode of transportation for an employee who prefers healthy options.

In some embodiments, expense recommendation trigger 139 is based, at least in part, on an expense policy 132 and/or an expense guideline 134. For example, an expense recommendation trigger 139 may identify recommended expenses that increase responsible spending behavior, for example by reducing spending, taking advantage of deals, earning rewards, etc.

In some embodiments, an expense recommendation trigger 139 is based, at least in part, on a determination that one expense is less expensive and/or more likely to be reimbursable than another expense. Recommending less expensive options may reduce expenses for an organization and decrease the incidence of expenses that need to be audited and/or are declined for reimbursement.

In some embodiments, an expense recommendation trigger 139 is based, at least in part, on an employee's spending score. An employee's spending score may be based, at least in part, on historical expense data 130 associated with the employee. For example, the employee spending score may be based on one or more of: whether the employee tends to be below spending limits; an average time that the employee takes to prepare expense descriptions for expenses that have already been incurred; an audit history of the employee (e.g., a history of allowed and/or rejected expense descriptions, which may be expressed as a ratio or some other metric); a comparison of the employee's past spending with a expense policy (e.g., a spending limit); and/or any other kind of data or combination thereof associated with the employee's spending. In some embodiments, employees with 'better' spending scores are at lower risk of audits than employees with 'worse' spending scores. An expense recommendation trigger 139 may identify less expensive options for employees with 'worse' spending scores than for employees with 'better' spending scores.

In some embodiments, an expense recommendation trigger 139 is based on one or more attributes of past, present, and/or planned business-related activity of an employee (e.g., a business trip or another kind of business-related activity). For example, trips of at least a threshold duration may qualify for certain reimbursable expenses (e.g., dry cleaning). As another example, flights of at least a threshold duration may qualify for a reimbursable seat upgrade. As another example, travel to international destinations may qualify for reimbursable international data roaming charges.

In some embodiments, an expense recommendation trigger 139 is based, at least in part, on an expense limit for a trip compared with an amount of expenses already incurred for the trip. For example, an expense recommendation trigger 139 may identify recommended expenses that are less expensive than other options, for an employee who is running out of expense budget on a trip. The expense recommendation trigger 139 may compare a remaining budget with a remaining time on the trip and recommend expenses that allocate the remaining budget across the remaining time.

In some embodiments, an expense recommendation trigger 139 is based, at least in part, on information about employees who are participating in the same business-related activities. For example, an expense recommendation trigger 139 may identify ride-sharing and/or other expense sharing opportunities for employees traveling to the same destination. The system 100 may present the recommended expense to one or more of those employees, to help encourage savings available by sharing expenses.

In some embodiments, a data repository 128 is configured to store one or more approval triggers 140. An approval trigger 140 is a codified set of rules and/or a set of one or more automatically learned patterns that capture one or more conditions for requiring approval of an expense description and/or expense report before submitting the expense description and/or expense report for reimbursement. An approval trigger 140 may be based, at least in part, on data corresponding to business-related activity of an employee and/or historical expense data 130. For example, an approval trigger 140 may indicate that all expense description requires approval if the expense exceeds or is within a certain amount of an expense limit. As another example, an approval trigger 140 may indicate that all expense descriptions in a particular category, and/or all expense descriptions prepared for a particular employee, require approval. As another example, expense descriptions that violate an expense policy 132 and/or an expense guideline 134 may require approval. As another example, employees themselves may be required to approve expense descriptions that are generated by the expense reporting service 112 in a user-independent mode (e.g., based on an expense trigger 138). Many different kinds of approval triggers 140 may be defined. In some embodiments, an expense reporting service 112 uses a machine learning engine 124 to determine an approval trigger 140 as part of a machine learning model 126.

In some embodiments, a data repository 128 is configured to store one or more audit triggers 142. An audit trigger 142 is a codified set of rules and/or a set of automatically learned patterns that capture one or more conditions for requiring auditing of an expense report, and/or for determining that an expense report or description is at risk of being audited. An audit trigger 142 may be based, at least in part, on data corresponding to business-related activity of an employee and/or historical expense data 130. In some embodiments, an audit trigger 142 is based, at least in part, on an audit risk score associated with a particular expense description. An audit trigger 142 may be satisfied when an audit risk score satisfies one or more threshold criteria (e.g., the audit risk score may be above or below a threshold number, or any other kind of threshold criteria or combination thereof). In some embodiments, an expense reporting service 112 uses a machine learning engine 124 to determine an audit trigger 142 as part of a machine learning model 126.

In some embodiments, a data repository 128 is configured to store one or more user credentials 144. An expense reporting service 112 may use a user credential 144 to access an external data source 146 and obtain data from the external data source 146. A user credential 144 may include a username, user identifier (ID), password, private key, public key, and/or any other kind of credential or combination thereof. In some embodiments, an employee supplies a user credential 144 to an expense reporting system 122 via a graphical user interface. For example, the expense reporting service 112 may use three-party authentication to obtain a user credential 144 from an employee.

In some embodiments, user data that is input into machine learning engine 124 is anonymized. Personal identifying information (PII) and other sensitive information may be replaced with an anonymous identifier, such as a cryptographic hash of the user data. Machine learning engine 124 may use the anonymized data to learn patterns and make predictions for different employees, within the same or different organizations, having similar attributes without compromising or revealing sensitive employee data.

Information describing one or more components that are illustrated here within a data repository 128 may be implemented across any of components within the system 100. However, this information is illustrated within the data repository 128 for purposes of clarity and explanation.

In some embodiments, an expense reporting service 112 is configured to receive data from one or more external data sources 146. An external data source 146 refers to hardware and/or software operating independent of the expense reporting service 112, i.e., under control of a different entity (e.g., a different company or other kind of organization) than an entity that controls the expense reporting service 112. An external data source 146 may supply data associated with an employee's business-related activity, such as travel, dining, meals, itineraries, appointments, emails, phone data, social media messages, credit card statements (e.g., for a business-provided credit card), and/or any other kind of target activity or combination thereof. The data may include information associated with an employee's expenses, which may or may not be reimbursable.

Some examples of an external data source 146 supplying data to an expense reporting service 112 include, but are not limited to: an airline or travel agency supplying data associated with an itinerary and/or ticket purchase; a food ordering application supplying data associated with a food order; a ride sharing service (e.g., Uber™, Lyft™, or another ride sharing service) supplying data associated with an instance of ride sharing; and a social media application (e.g., Facebook™, Foursquare™, or another social media application) supplying data corresponding to a check-in at a location (e.g., a restaurant, hotel, entertainment venue, or other location). Many different kinds of external data sources 146 may supply many different kinds of data.

In some embodiments, an expense reporting service 112 is configured to retrieve data from an external data source 146 by 'pulling' the data via an application programming interface (API) of the external data source 146, using user credentials 144 that a user has provided for that particular external data source 146. Alternatively or additionally, an external data source 146 may be configured to 'push' data to the expense reporting service 112 via an API of the expense reporting service, using an access key, password, and/or other kind of credential that a user has supplied to the external data source 146. An expense reporting service 112 may be configured to receive data from an external data source 146 in many different ways.

In some embodiments, a reimbursement service 148 refers to hardware and/or software configured to perform operations for reimbursing approved expenses. For example, the reimbursement service 148 may be part of an accounting service that applies reimbursements for approved expenses to employee's paychecks and/or separate reimbursement checks, which may be mailed to employees and/or direct-deposited into employee's bank accounts. Many different techniques for reimbursing approved expenses exist.

In some embodiments, an expense reporting service 112 includes or interfaces with an intelligent agent. An intelligent agent may comprise an autonomous virtual persona that interacts via natural language with one or more users. For example, users may provide natural language queries by speaking, which may be captured through the microphone of a smart speaker or other microphone-enabled network device. As another example, users may type and submit natural language queries via a chatbot application or web interface. The intelligent agent may use natural language processing and machine learning techniques described further herein to process the queries and provide relevant responses. The responses may be output via a speaker, display, or other user interface.

In some embodiments, one or more components of the system 100 implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. REAL-TIME EXPENSE AUDITING

FIGS. 2A-3B illustrate an example set of operations for real-time expense auditing in accordance with one or more embodiments. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

In some embodiments, a system (e.g., one or more components of the system 100 illustrated in FIG. 1) receives an expense description (Operation 202). The expense description may be associated with an expense that has already been incurred by the employee. Alternatively, the expense description may be associated with an anticipated or planned expense that has not yet been incurred by the employee, such that the employee is able to use the system to determine an audit risk associated with the expense before actually incurring the expense. A user may supply user input corresponding to the expense description. Alternatively, the system may generate the expense description in a user-independent mode (i.e., without requiring or requesting user input corresponding to instructions to generate the expense description), for example based on an expense trigger.

In some embodiments, the system computes an employee spending score (Operation 204). The employee spending score may be based, at least in part, on historical expense data associated with the employee. For example, the employee spending score may be based on one or more of: whether the employee tends to be below spending limits; an average time that the employee takes to prepare expense descriptions for expenses that have already been incurred; an audit history of the employee (e.g., a history of allowed and/or rejected expense descriptions, which may be expressed as a ratio or some other metric); a comparison of the employee's past spending with a expense policy (e.g., a spending limit); and/or any other kind of data or combination thereof associated with the employee's spending. In an embodiment, employees with 'better' spending scores are at lower risk of audits than employees with 'worse' spending scores. Alternatively or additionally, the system may be more likely to generate and/or submit expense descriptions and/or expense reports in a user-independent mode (i.e., without requiring or requesting user input corresponding to an instruction to generate or submit the expense description or expense report) for employees with 'better' spending scores.

In some embodiments, the system determines an amount of time between (a) when the expense described in the expense description was incurred and (b) a time when the system received the expense description (Operation 206). Longer times between incurring and reporting expenses may be associated with lower accuracy of expense reporting. Thus, longer times may result in higher audit risk scores, as described below.

In some embodiments, the system computes an audit risk score (Operation 208). In general, an audit risk score indicates a likelihood (measured as a number, letter grade, and/or another metric or combination thereof) that an expense description will be audited. The audit risk score may be based, at least in part, on an employee spending score. Alternatively or additionally, the audit risk score may be based on an amount of time between (a) when the expense described in the expense description was incurred and (b) a time when the system received the expense description. Alternatively or additionally, the audit risk score may be based on an expense policy and/or expense guideline. An audit risk score may be based on many different factors. In an embodiment, the system computes the audit risk score by applying data to a machine learning model that is configured to compute audit risk scores.

In some embodiments, the audit risk score is based, at least in part, on an expense policy. For example, the audit risk score may be based on a corporate-level spending policy. An expense description for an expense that exceeds or is within a threshold amount of a spending limit defined by an expense policy may result in an audit risk score indicating a higher audit risk. The audit risk score may be associated with an expense policy. Alternatively or additionally, the audit risk score may be based, at least in part on an expense guideline. An expense description for an expense that exceeds or is within a threshold amount of a spending limit defined by an expense guideline may result in an audit risk score indicating a higher audit risk. Alternatively or additionally, the audit risk score may be based, at least in part, on the health of a corporate credit card used by the employee. An expense description for an expense that is charged to a credit card has reached its credit limit, or is within a threshold amount of its credit limit, may result in an audit risk score indicating a higher audit risk.

In some embodiments, the system compares the audit risk score with an audit trigger (Operation 210). In some embodiments, based on the comparison, the system determines whether the audit risk score satisfies the audit trigger (Operation 212). If the audit risk score does not satisfy the audit trigger, the system continues processing the expense description (Operation 224). Alternatively, the system may determine that the audit risk score satisfies the audit trigger. The system may determine that the audit risk score satisfies the audit trigger (and may generate any corresponding alerts, as described below) before the expense description is submitted for approval and/or auditing (e.g., as part of an expense report). Alternatively, the system may determine that the audit risk score satisfies the audit trigger after the expense description has already been submitted for approval and/or auditing. A submitted expense description may not be editable by the employee. The system may transition an expense description that has already been submitted into a different state that permits an employee to edit the expense description. Specifically, the system may transition the expense description from a submitted state to an editing state (Operation 214). In this case, after editing the expense description, the employee may resubmit the expense description.

In some embodiments, the system alerts an employee to review the expense description (Operation 216). The system may present, in a graphical user interface, a message to the employee indicating that the expense description is at risk of being audited and requires review and/or editing. The message may include a suggested edit to reduce the likelihood that the expense description is rejected by an auditor. For example, the message may indicate one or more reasons why the expense description is at risk of being audited and request an explanation for the indicate reason(s).

In some embodiments, the system obtains, from the employee, an explanation of the expense description (Operation 218). Specifically, responsive to the message, the employee may supply user input corresponding to the requested explanation. The employee's explanation may include information about the expense that the employee believes justifies approval of the expense description, even if the expense description might otherwise be subject to rejection.

Alternatively or additionally, the employee may edit one or more fields of the expense description, other than providing an explanation of the expense description. The system may determine whether the employee has edited one or more other fields of the expense description (Operation 220). If the employee has edited another field of the expense description, the system may repeat the process of determining whether the audit risk score satisfies the audit trigger (Operation 212). Before repeating the process of determining whether the audit risk score satisfies the audit trigger, the system may recompute the audit risk score based on the edited data. The recomputed audit risk score may no longer satisfy the audit trigger.

In some embodiments, the system alerts an auditor that the expense description is subject to auditing (Operation 222). If the employee has edited the expense description so that the audit risk score no longer satisfies the audit trigger, the system may not alert the auditor. Alternatively, the system may alert the auditor even if the employee has edited the expense description so that the audit risk score no longer satisfies the audit trigger. Alerting the auditor informs the auditor that the expense description requires auditing, including review of any explanatory information supplied by the employee.

In some embodiments, the system continues processing the expense description (Operation 224). The system may generate and/or submit an expense report that includes the expense description, optionally in a user-independent mode. Alternatively or additionally, the system may forward the expense description to an employee in an approval role and/or an employee in an auditor role. If the expense description has not yet been submitted by the employee as part of an expense report, the system may not take any further action with respect to the expense description unless the employee edits the expense description, the system receives the expense report, and/or some other event occurs that requires the system to further process the expense description.

4. MACHINE LEARNING BASED SCORING AND AUDIT TRIGGERS

In some embodiments, the expense reporting service 112 leverages machine learning to compute spending and/or audit scores. Additionally or alternatively, the expense reporting service 112 may leverage machine learning to evaluate audit triggers. Machine learning allows expense reporting service 112 to perform tasks and capture patterns that are not hard-coded or otherwise explicitly programmed into the system. Machine learning further allows expense reporting service 112 to adapt to different application use-cases and evolve over time without requiring complex reprogramming or other changes in the underlying application code.

Figure 3:
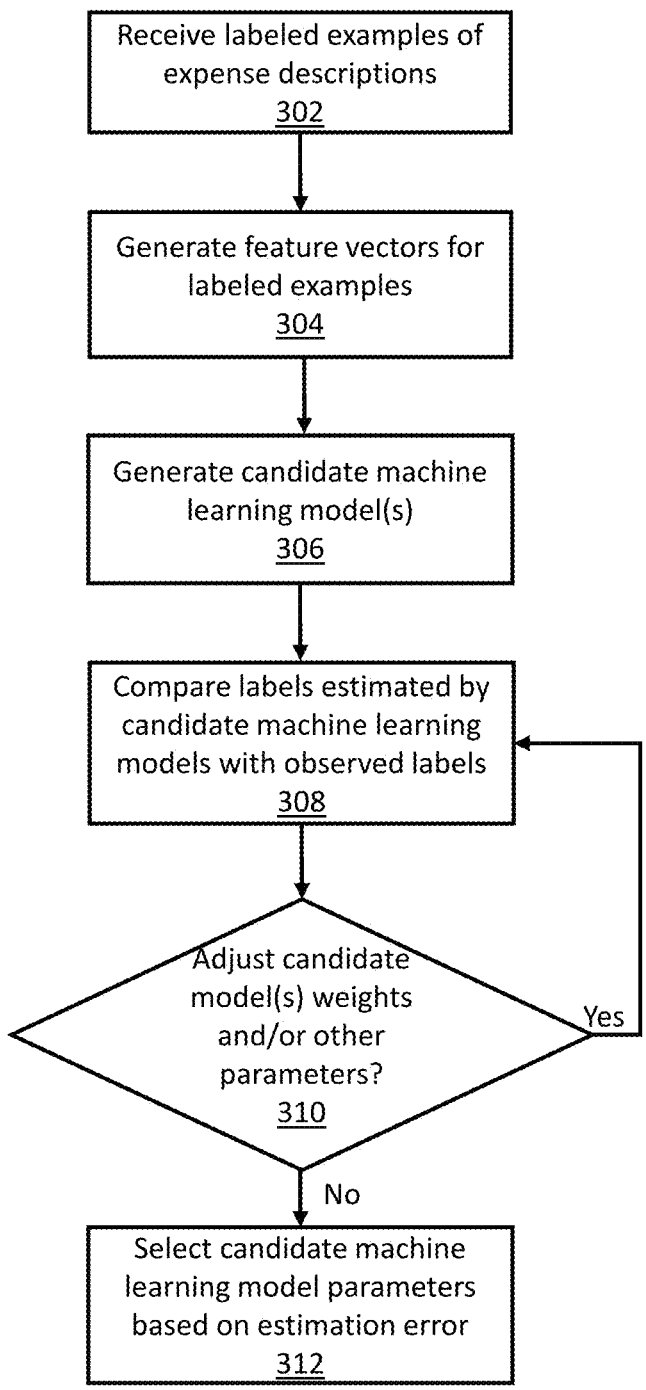
FIG. 3 illustrates an example set of operations for training a machine learning model to assign audit-related scores and evaluate audit risks based on learned expense patterns in accordance with some embodiments.

FIG. 3 illustrates an example set of operations for training a machine learning model to assign audit-related scores and evaluate audit risks based on learned expense patterns in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

In some embodiments, a system (e.g., one or more components of system 100 illustrated in FIG. 1) receives a set of labeled examples of target activity and/or expense descriptions for training a machine learning model (Operation 302). An example in the training dataset may include one or more labels, where a label corresponds to a classification for one or more activities and/or one or more expenses. For example, a label may indicate whether an activity or set of activities incurred reimbursable expenses or not. As another example, a label may indicate whether an expense or pattern of expenses triggered an audit.

In some embodiments, examples in the training set include multiple expenses and/or activities that are related. For instance, a single example may include a set of descriptions for expenses that were incurred by an employee on a single business trip. In this instance, the expenses may be related (a) temporally since the expenses are likely to have occurred within a relatively short timeframe of the trip; (b) geographically since the trip was likely constrained to a limited number of locations; and (c) by entity since the expenses were incurred by the same employee. Additionally or alternatively, an example may include a group of expense descriptions from different employees where the expenses and/or expenses are related in some way. For example, an example may include expenses from employees on the same trip, at the same event, at the same vendor, in the same department, or some combination thereof.

In some embodiments, the system generates a set of feature vectors for the labeled examples (Operation 304). A feature vector for an example may be n-dimensional, where n represents the number of features in the vector. The number of features that are selected may vary depending on the particular implementation. The features may be curated in a supervised approach or automatically selected from extracted attributes during model training and/or tuning. Example features include information about the employee or employees that incurred an expense (e.g., employee job title, clearance level, department), geographic information about where an expense or activity occurred (e.g., continent, country, state, city), temporal information about when an expense or activity occurred (e.g., date and time), categorical information about what type of an expense was incurred or activity performed (e.g., vendor identifier, vendor category, product identifier, product category, activity name, activity patterns), and the expense amount. Additionally or alternatively, the feature vector may include values associated with an expense policy of an organization, such as rules about what types of expenses are not permissible and/or the conditions under which an expenses is reimbursable. In some embodiments, a feature within a feature vector is represented numerically by one or more bits. The system may convert categorical attributes to numerical representations using an encoding scheme, such as one hot encoding.

In some embodiments, the system generates one or more candidate machine learning models that apply weights as a function of extracted features (Operation 306). In some cases, the system may generate and train a candidate recurrent neural network model, such as a long short-term memory (LSTM) model. With recurrent neural networks, one or more network nodes or "cells" may include a memory. A memory allows individual nodes in the neural network to capture dependencies based on the order in which feature vectors are fed through the model. The weights applied to a feature vector representing one expense or activity may depend on its position within a sequence of feature vector representations. Thus, the nodes may have a memory to remember relevant temporal dependencies between different expenses and/or activities. For example, a dinner expense in isolation may have a first set of weights applied by nodes as a function of the respective feature vector for the expense. However, if the dinner expense is immediately preceded by an earlier dinner expense, then a different set of weights may be applied by one or more nodes based on the memory of the preceding expense. In this case, whether the second dinner expense is reimbursable or not may be affected by the first dinner expense. As another example, one or more nodes may apply different weights if an expense is unique or a duplicate of another expense on the same day. In this case, the trained machine learning model may automatically filter out and reject duplicate expenses made on the same day while recurring expenses (e.g., monthly subscriptions) may be permitted. Additionally or alternatively, the system may generate and train other candidate models, such as support vector machines, decision trees, Bayes classifiers, and/or fuzzy logic models, as previously described.

In some embodiments, the system compares the labels estimated through the one or more candidate models with observed labels to determine an estimation error (Operation 308). The system may perform this comparison for a test set of examples, which may be a subset of examples in the training dataset that were not used to generate and fit the candidate models. The total estimation error for a candidate may be computed as a function of the magnitude of the difference and/or the number of examples for which the estimated label was wrongly predicted. For example, a label may predict that a set of expenses will not trigger an audit with a given level of confidence. If an audit is triggered, then the example may be relabeled accordingly and provided as feedback to the model to continue model tuning and learning.

In some embodiments, the system determines whether to adjust the weights and/or other model parameters based on the estimation error (Operation 310). Adjustments may be made until a candidate model that minimizes the estimation error or otherwise achieves a threshold level of estimation error is identified. In some embodiments, an audit risk score and/or employee spending score corresponds to a model weight or parameter. The process may return to Operation 308 to make adjustments and continue training the machine learning model.

In some embodiments, the system selects a candidate machine learning model parameters based on the estimation error (Operation 312). For example, the system may select a machine learning model having weights and other model parameters (e.g., selected feature combinations used to form the feature vectors) that yield the lowest estimation error for the test dataset.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. In recurrent neural networks, time is also factored into the backpropagation process. As previously mentioned, a given example may include a sequence of related expenses and/or activities incurred on a trip. Each expense or activity may be processed as a separate discrete instance of time. For instance, an example may include expenses $e_1$, $e_2$, and $e_3$ corresponding to times t, t+1, and t+2, respectively. Backpropagation through time may perform adjustments through gradient descent starting at time t+2 and moving backward in time to t+1 and then to t. Further, the backpropagation process may adjust the memory parameters of a cell such that a cell remembers contributions from previous expenses in the sequence of expenses. For example, a cell computing a contribution for $e_3$ may have a memory of the contribution of $e_2$, which has a memory of $e_1$. The memory may serve as a feedback connection such that the output of a cell at one time (e.g., t) is used as an input to the next time in the sequence (e.g., t+1). The gradient descent techniques may account for these feedback connections such that the contribution of one expense or activity to a cell's output may affect the contribution of the next expense or activity in the cell's output. Thus, the contribution of $e_1$ may affect the contribution of $e_2$, etc.

Additionally or alternatively, the system may train other types of machine learning models. For example, the system may adjust the boundaries of a hyperplane in a support vector machine or node weights within a decision tree model to minimize estimation error. Once trained, the machine learning model may be used to estimate labels for new examples of expenses.

In some embodiments, the model is trained to learn temporal, geographic, and/or entity-based patterns. Temporal patterns may manifest when expenses are incurred within a particular timeframe or at a particular interval. For example, a policy may permit employees to expense $75 per diem. If a given employee expenses just under the amount a single day or a few days, then it may not present an audit risk. However, if the employee runs up to the limit every day (or nearly every day) over the course of a longer-term timeframe, then an audit may be much more likely to prevent abuse of the policy. Geographic patterns may account for the location where expenses are incurred. For instance, an expense or series of expenses in certain regions may increase the risk of an audit. Additionally or alternatively, entity-based patterns may be captured by the model. An expense or series of expenses may increase or decrease the likelihood of an audit depending on the attributes of the entity or group of entities incurring the expenses. The machine learning model may account for similarities in employee roles within the same organization and/or across different organizations to automatically learn and extrapolate patterns to compute audit risk scores and/or employee spending scores. For example, the model may classify a given set of expenses as not an audit risk if incurred by a vice president of an organization rather than an entry-level employee. The model may also compute a higher spending score for the vice president in comparison to the entry-level employee. Additionally or alternatively, the model may be trained to learn more complex patterns involving combinations of temporal, geographic, and/or entity-based attributes. For example, an expense incurred on a daily basis by a veteran employee having a particular user role in a given region may not be classified as an audit risk while the same daily expense incurred by a new employee, one with a lower-level employee role, and/or an expense incurred at a different location may trigger an alert.

Figure 4:
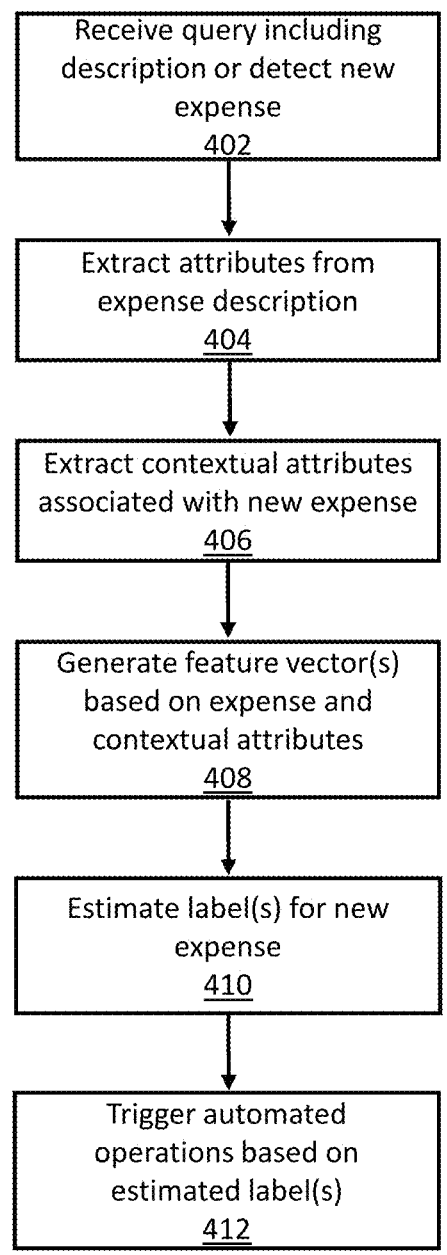
FIG. 4 illustrates an example set of operations for applying new activities and expenses to a trained machine learning model in accordance with some embodiments.

FIG. 4 illustrates an example set of operations for applying new activities and expenses to a trained machine learning model in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

In some embodiments, the system (e.g., one or more components of system 100 illustrated in FIG. 1) (a) receives a query including a description of a new hypothetical or actual expense; or (b) detects a newly incurred expense (Operation 402). A query may be written in a natural language or conform to a query language syntax. The query may be submitted via an intelligent agent interface, such as via a smart speaker or chatbot application. Expenses may be automatically detected through an API, as previously described, through linked sources. For example, a ridesharing app or cloud service may push expenses data to the system via the API.

In some embodiments, the system extracts a set of attributes from the new expense description (Operation 404). In some embodiments, an intelligent agent uses natural language processing to extract expense attributes, such as the expense amount, expense category, and expense location. One or more of the expense attributes may be extracted from metadata associated with the query. For example, an expense location may be extracted from a geo-tag provided via a mobile application. Additionally or alternatively, an intelligent agent may map the query to one or more intents, where an intent represents an available action that the querying entity intends to be executed. The intelligent agent may determine what attributes to extract based on the one or more intents.

In some embodiments, the system extracts contextual attributes associated with the new expense (Operation 406). Contextual attributes may include temporal, geographic, entity-based, and/or policy-based attributes associated with the expense such as those previously described. Additionally or alternatively, contextual attributes may include attributes about other expenses that have been incurred by the user, such as information about the expense amounts, categories, and geographic locations of expenses incurred within a threshold timeframe (e.g., within a given week, month, or year, or on a particular trip). Additionally or alternatively, contextual attributes may include attributes about expense policies defined by the employer or other organization which employs the user. Additionally or alternatively, contextual attributes may include expenses incurred by other employees that are linked to the current expense in some manner (e.g., temporally, geographically, relationally, etc.)

In some embodiments, the system generates a set of one or more feature vectors based on the expense and contextual attributes (Operation 408). The system may use the same combinations of features used to train the machine learning model. The system may generate a set of features vectors where one or more feature vectors represent expenses incurred by the employee within a threshold timeframe and another feature vector represents a proposed expense queried about by the user. In other embodiments, the expense may be applied to the machine learning model in isolation of any expenses previously incurred by the employee. The one or more feature vectors may be a unique example such that the combination of feature values and/or sequence of feature vectors was not included in the training dataset.

In some embodiments, the system inputs the set of one or more feature vectors to the trained machine learning model to estimate a label for the new expense (Operation 410). In the case of a recurrent neural network, for example, the system may perform forward propagation using a sequence of feature vectors representing different expenses and/or activities in the order that the expenses and/or activities occurred. As another example, in the case of a support vector machine, the system may compute a location in the hyperplane for the feature vector relative to the hyperplane boundaries. As another example, the system may follow a decision tree as a function of the input set of one or more feature vectors.

In some embodiments, the estimated label corresponds to a classification for an expense or activity queried about by the user. The estimated label may be output by the machine learning model as a function of the one or more input feature vector and the patterns learned from the training dataset. For example, the trained machine learning model may classify an expense as "reimbursable" or "non-reimbursable". As another example, the trained machine learning model may classify an activity, queried about by the user, as an audit trigger or not an audit trigger.

In some embodiments, a label includes a numerical value. For example, a machine learning model may be trained to estimate a probability that an expense or series of expenses will trigger an audit. When the machine learning model is fed a new feature vector as input to the trained model, which may output an estimated percentage or amount based on patterns learned from the training dataset. Additionally or alternatively, the model may output an employee spending score and/or an audit score. An employee spending score may represent a risk that a corresponding employee will be audited and an audit score may represent a risk that a corresponding set of one or more expenses will be audited. The score may be computed as a function of the predicted likelihood of audit output by the machine learning model. For example, a score of 0.7 may indicate that the machine learning model predicts a 70% probability of an employee, expense, or activity triggering an audit. The scale and values of the scores may vary depending on the particular implementation.

In some embodiments, the system triggers one or more automated operations based on the estimated label (Operation 412). The automated actions that are triggered may depend on whether an audit trigger is satisfied. For example, if the estimated label is a score, then the score may be compared with a threshold to determine whether the audit trigger is satisfied. As another example, the estimated label may classify a set of expenses as an audit risk, thereby satisfying the audit trigger, or not based on the learned patterns. If the audit trigger is satisfied, then the system triggers one or more responsive actions may be taken to address the audit risk. As previously described, the system may prompt the employee, through a GUI, for more information about the expense. Additionally or alternatively, the system may send an alert to the employee, an auditor, and/or another user.

In some embodiments, the system may push a response to a user based on the output of the machine learning model. For example, if the estimated label indicates that a queried about expense is an audit risk, then an intelligent agent may notify the user, such as via a smart speaker or app interface. The intelligent agent may further provide reasons why the expense was classified as an audit risk based on the learned patterns. For example, the intelligent agent may indicate that the expense is an audit risk because of the employees spending score, the amount of the expense, the category of expense, the geographic location of the expense, and/or a combination of other attributes.

Additionally or alternatively, the system may perform other automated actions based on the estimated label. For example, the system may automatically add the expense to an expense report if the estimated label indicates that the expense does not satisfy the audit trigger or is otherwise not an audit risk. If the estimated label indicates that the expense is an audit risk, then the system may prevent the expense from being added to the electronic expense report. Additionally or alternatively, the system may present alternative expense options with similar feature vectors that are less likely to trigger audits.

5. ILLUSTRATIVE EXAMPLE

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5A:
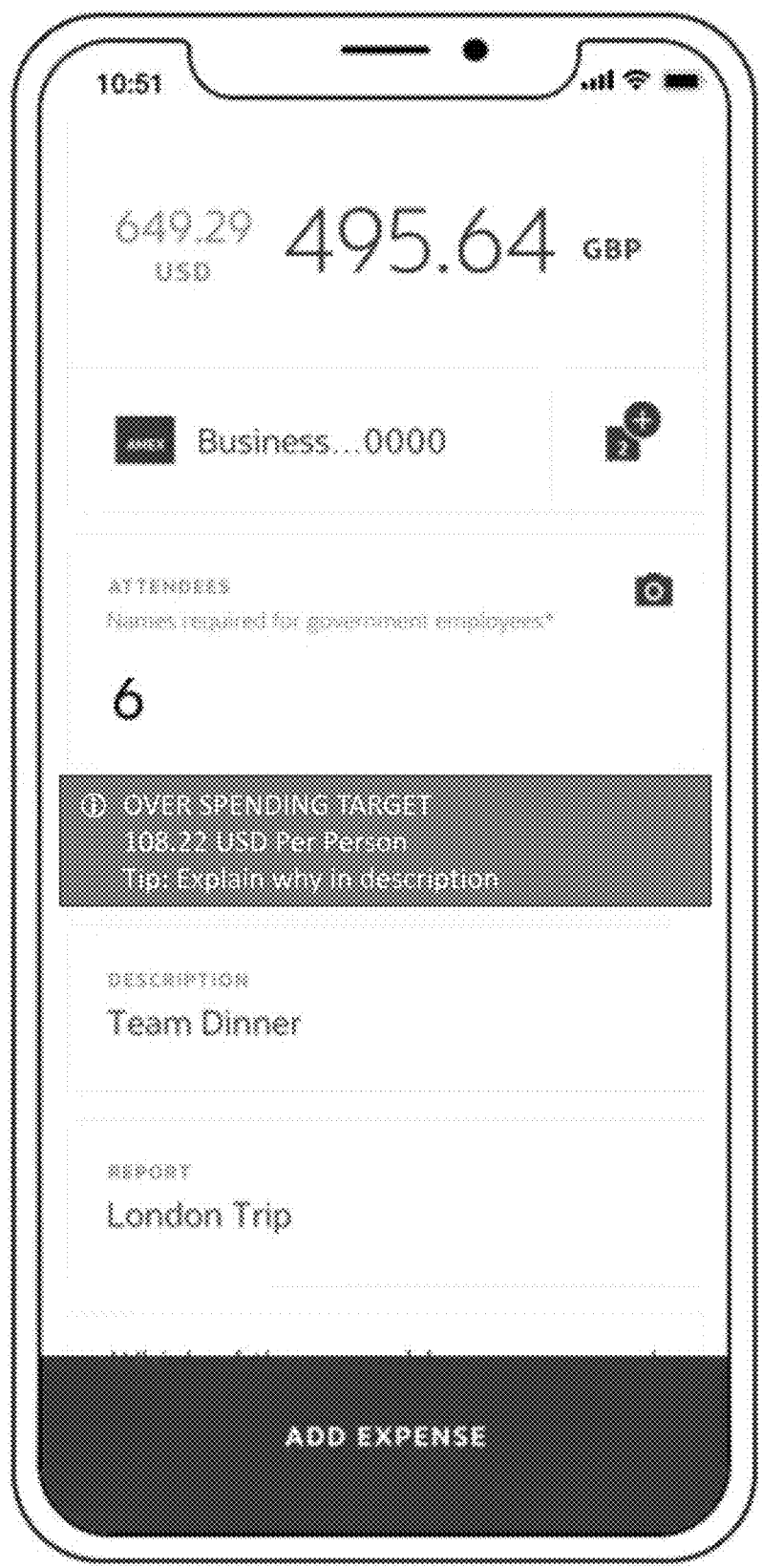
FIGS. 5A-5C illustrate examples in accordance with one or more embodiments.
Figure 5B:
Figure 5C:
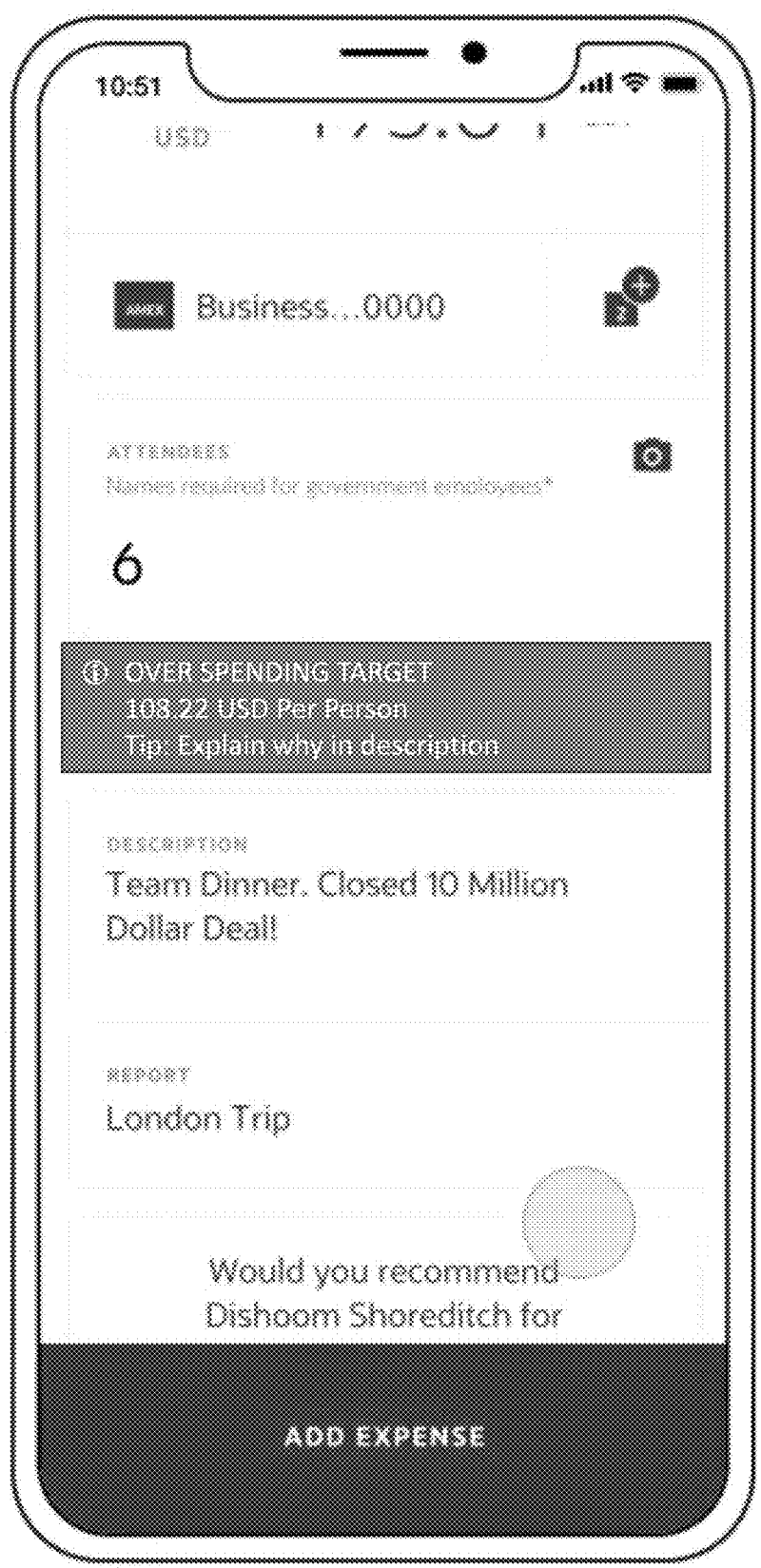

FIGS. 5A-5C illustrate examples in accordance with one or more embodiments. As illustrated in FIG. 5A, an employee has provided an expense description, corresponding to a team dinner, where the amount spent per employee exceeds an amount permitted by an expense policy and/or expense guideline. The system has determined that the expense description is at risk of being audited. The system presents a message, in a graphical user interface of a mobile device, requesting that the employee supply an explanation for the excessive per-person spending. In FIG. 5B, the employee supplies an explanation for the excessive per-person spending. Specifically, in this example, the dinner resulted in closing a $10 million deal, which the employee believes justifies the over-limit spending. FIG. 5C illustrates the edited expense description, which still is at risk of being audited but now includes the explanation provided by the employee. When an auditor reviews this expense description, the auditor may be more likely to approve the expense description in light of the employee's explanation.

6. HARDWARE OVERVIEW

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
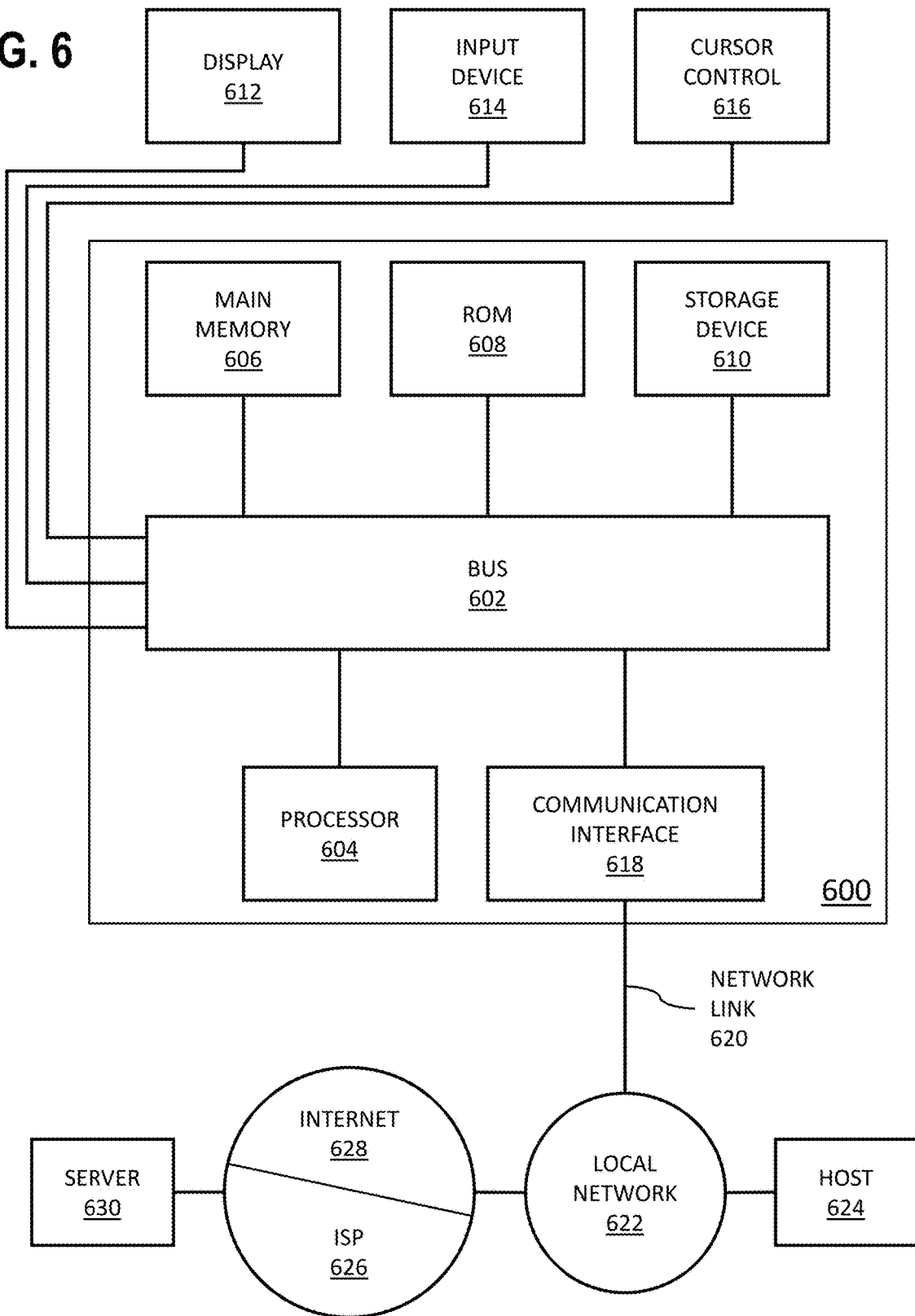
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), plasma display, electronic ink display, cathode ray tube (CRT) monitor, or any other kind of device for displaying information to a computer user. An input device 614, including alphanumeric and other keys, may be coupled to bus 602 for communicating information and command selections to processor 604. Alternatively or in addition, the computer system 600 may receive user input via a cursor control 616, such as a mouse, a trackball, a trackpad, a touchscreen, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. The display 612 may be configured to receive user input via one or more pressure-sensitive sensors, multi-touch sensors, and/or gesture sensors. Alternatively or in addition, the computer system 600 may receive user input via a microphone, video camera, and/or some other kind of user input device (not shown).

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 600 can receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. COMPUTER NETWORKS AND CLOUD NETWORKS

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

TRIGGERS

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

ACTIONS

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   training, by an expense auditing system, a neural network to compute audit risk scores as a function of expense descriptions, wherein training the neural network comprises performing adjustments to memory parameters of one or more cells in the neural network that include a memory to learn temporal dependencies based on an order in which feature vectors representing a sequence of expense activity are fed through the neural network, wherein the memory of a cell serves as a feedback connection that causes a first output of the cell to affect a contribution of a second output of the cell to the audit risk scores;
   receiving, by the expense auditing system through an application programming interface from one or more external data sources, a set of expenses associated with an employee;
   after training the neural network, receiving, by the expense auditing system through an intelligent agent interface, a query about an expense that includes an expense description associated with the expense;
   responsive to receiving the query through the intelligent agent interface, identifying, by the expense auditing system within the set of expenses received from the one or more external data sources, at least one other expense incurred within a threshold timeframe from the expense and generating a set of feature vectors including a first feature vector representing the expense that includes values based on attributes extracted from the expense description and at least one other feature vector representing the at least one other expense incurred within the threshold timeframe from the expense;
   computing, by the expense auditing system using the trained neural network, a first audit risk score associated with the expense description, wherein the trained neural network estimates the first audit risk score by performing forward propagation, using a sequence of feature vectors including the first feature vector representing the expense and the at least one other feature vector representing the at least one other expense in an order in which the expense and the at least one other expense occurred, based at least in part on the memory parameters associated with the one or more cells in the neural network and at least one learned temporal dependency between the expense description and a previous expense activity associated with the employee;
   comparing, by the expense auditing system, the first audit risk score with an audit trigger comprising one or more conditions that, when satisfied, identifies expense descriptions that are at risk of being audited;
   determining, by the expense auditing system, that the first audit risk score satisfies the audit trigger; and
   responsive to determining that the first audit risk score satisfies the audit trigger: alerting, by the expense auditing system, the employee that the expense description is at risk of being audited.

2. The one or more media of claim 1, further storing instructions which, when executed by one or more processors, cause:
   responsive to determining that the first audit risk score satisfies the audit trigger: transitioning the expense description from a submitted state in which the expense description is not editable by the employee to an editing state in which the expense description is editable by the employee.

3. The one or more media of claim 1, further storing instructions which, when executed by one or more processors, cause:
   computing, by the expense auditing system, an employee spending score associated with the employee,
   wherein the first audit risk score is based at least in part on the employee spending score.

4. The one or more media of claim 3, further storing instructions which, when executed by one or more processors, cause:
   training the neural network to compute employee spending scores;
   wherein training the neural network accounts for similarities in employee roles within one or more organizations to compute the employee spending scores.

5. The one or more media of claim 1, further storing instructions which, when executed by one or more processors, cause:
   determining, by the expense auditing system, a time period between (a) an expense described in the expense description and (b) receiving the expense description,
   wherein the first audit risk score is based at least in part on the time period.

6. The one or more media of claim 1, wherein the expense description is associated with an anticipated or planned expense that has not yet been incurred by the employee.

7. The one or more media of claim 1, further storing instructions which, when executed by one or more processors, cause:
   monitoring, by an expense report generation system, one or more data sources to obtain data corresponding to business-related activity of the employee;
   generating, by the expense report generation system, the expense description based on the data corresponding to business-related activity of the employee.

8. The one or more media of claim 1, further storing instructions which, when executed by one or more processors, cause:
   subsequent to alerting the employee that the expense description is at risk of being audited: receiving, by the expense auditing system, an edited expense description comprising one or more edits of the expense description by the employee;

computing, by the expense auditing system, a second audit risk score associated with the edited expense description;

comparing, by the expense auditing system, the second audit risk score with the audit trigger;

determining, by the expense auditing system, that the second audit risk score does not satisfy the audit trigger.

9. The one or more media of claim 1, further storing instructions which, when executed by one or more processors, cause:

alerting, by the expense auditing system, an auditor other than the employee of the expense description that is at risk of being audited.

10. The one or more media of claim 1, further storing instructions which, when executed by one or more processors, cause:

responsive to determining that the first audit risk score satisfies the audit trigger: requesting, by the expense auditing system, an explanation of the expense description by the employee.

11. The one or more media of claim 10, further storing instructions which, when executed by one or more processors, cause:

generating an expense report comprising the expense description and the explanation of the expense description.

12. The one or more media of claim 1, wherein the first audit risk score is based at least in part on a corporate spending policy.

13. The one or more media of claim 1, wherein the first audit risk score is based at least in part on a credit limit of a corporate credit card used by the employee.

14. The one or more media of claim 1, wherein the first audit risk score is based at least in part on a spending policy that is more restrictive than a corporate spending policy.

15. A system comprising:

at least one device including a hardware processor;

the system being configured to perform operations comprising:

training, by an expense auditing system, a neural network to compute audit risk scores as a function of expense descriptions, wherein training the neural network comprises performing adjustments to memory parameters of one or more cells in the neural network that include a memory to learn temporal dependencies based on an order in which feature vectors representing a sequence of expense activity are fed through the neural network, wherein the memory of a cell serves as a feedback connection that causes a first output of the cell to affect a contribution of a second output of the cell to the audit risk scores;

receiving, by the expense auditing system through an application programming interface from one or more external data sources, a set of expenses associated with an employee;

after training the neural network, receiving, by the expense auditing system through an intelligent agent interface, a query about an expense that includes an expense description associated with the expense;

responsive to receiving the query through the intelligent agent interface, identifying, by the expense auditing system within the set of expenses received from the one or more external data sources, at least one other expense incurred within a threshold timeframe from the expense and generating a set of feature vectors including a first feature vector representing the expense that includes values based on attributes extracted from the expense description and at least one other feature vector representing the at least one other expense incurred within the threshold timeframe from the expense;

computing, by the expense auditing system using the trained neural network, a first audit risk score associated with the expense description, wherein the trained neural network estimates the first audit risk score by performing forward propagation, using a sequence of feature vectors including the first feature vector representing the expense and the at least one other feature vector representing the at least one other expense in an order in which the expense and the at least one other expense occurred, based at least in part on the memory parameters associated with the one or more cells in the neural network and at least one learned temporal dependency between the expense description and a previous expense activity associated with the employee;

comparing, by the expense auditing system, the first audit risk score with an audit trigger comprising one or more conditions that, when satisfied, identifies expense descriptions that are at risk of being audited;

determining, by the expense auditing system, that the first audit risk score satisfies the audit trigger; and responsive to determining that the first audit risk score satisfies the audit trigger: alerting, by the expense auditing system, the employee that the expense description is at risk of being audited.

16. A method comprising:

training, by an expense auditing system, a neural network to compute audit risk scores as a function of expense descriptions, wherein training the neural network comprises performing adjustments to memory parameters of one or more cells in the neural network that include a memory to learn temporal dependencies based on an order in which feature vectors representing a sequence of expense activity are fed through the neural network, wherein the memory of a cell serves as a feedback connection that causes a first output of the cell to affect a contribution of a second output of the cell to the audit risk scores;

receiving, by the expense auditing system through an application programming interface from one or more external data sources, a set of expenses associated with an employee;

after training the neural network, receiving, by the expense auditing system through an intelligent agent interface, a query about an expense that includes an expense description associated with the expense;

responsive to receiving the query through the intelligent agent interface, identifying, by the expense auditing system within the set of expenses received from the one or more external data sources, at least one other expense incurred within a threshold timeframe from the expense and generating a set of feature vectors including a first feature vector representing the expense that includes values based on attributes extracted from the expense description and at least one other feature vector representing the at least one other expense incurred within the threshold timeframe from the expense;

computing, by the expense auditing system using the trained neural network, a first audit risk score associated with the expense description, wherein the trained neural network estimates the first audit risk score by performing forward propagation, using a sequence of feature vectors including the first feature vector representing the expense and the at least one other feature vector representing the at least one other expense in an order in which the expense and the at least one other expense occurred, based at least in part on the memory parameters associated with the one or more cells in the neural network and at least one learned temporal dependency between the expense description and a previous expense activity associated with the employee;

comparing, by the expense auditing system, the first audit risk score with an audit trigger comprising one or more conditions that, when satisfied, identifies expense descriptions that are at risk of being audited;

determining, by the expense auditing system, that the first audit risk score satisfies the audit trigger; and responsive to determining that the first audit risk score satisfies the audit trigger: alerting, by the expense auditing system, the employee that the expense description is at risk of being audited, wherein the method is performed by at least one device comprising a hardware processor.

17. The one or more media of claim 1, wherein training the neural network comprises executing a backpropagation process backward through time to perform the adjustments to the memory parameters, wherein the memory parameters for a cell are adjusted based at least in part on contributions from a previous expense in a sequence of expenses.

18. The one or more media of claim 3, wherein computing the employee spending scores is further based at least on an average time, for the employee, between (a) incurring expenses and (b) preparing expense descriptions.

19. The one or more media of claim 3, wherein computing the employee spending scores is further based at least on a comparison of past spending by the employee with an expense policy.

20. The one or more media of claim 3, further storing instructions which, when executed by one or more processors, cause:

training the neural network to compute employee spending scores;

wherein training the neural network accounts for similarities in employee roles across different organizations to compute the employee spending scores.

21. The one or more media of claim 1, wherein the intelligent interface includes a smart speaker or chatbot application.

22. The one or more media of claim 1, wherein the one or more external data sources comprise a ridesharing app or cloud service.

23. The one or more media of claim 1, wherein the query is written in a natural language or conforms to a query language syntax.

* * * * *